United States Patent [19]

Harmel

[11] 4,259,734
[45] Mar. 31, 1981

[54] FINE-RESOLUTION, WATER-DEPTH MEASURING SYSTEM

[75] Inventor: Norman A. Harmel, Winston-Salem, N.C.

[73] Assignee: Western Electric Company, Inc., New York, N.Y.

[21] Appl. No.: 106,226

[22] Filed: Dec. 21, 1979

[51] Int. Cl.³ .................................. G01S 15/08
[52] U.S. Cl. .................................. 367/101; 367/108
[58] Field of Search .......................... 367/108, 101

[56] References Cited

U.S. PATENT DOCUMENTS

| | | | |
|---|---|---|---|
| 3,076,519 | 2/1963 | Alsabrook | 367/108 |
| 3,458,854 | 7/1969 | Murphree | 367/101 |
| 3,528,053 | 9/1970 | Rubin | 367/108 |
| 3,588,795 | 6/1971 | Linardos et al. | 367/108 |
| 3,710,310 | 1/1973 | Moss et al. | 367/108 |
| 3,733,582 | 5/1973 | Eck et al. | 367/108 |
| 3,787,802 | 1/1974 | Braham | 367/108 |

OTHER PUBLICATIONS

Raytheon Literature, (PTR-105B & 106C), 2 sheets, "Sonar Transceiver".
Endo Western Literature, "Model 4041 Stabilized Narrow beam Bathymetric System," 4 sheets.
General Instrument Corp. Literature, (16 Beam and 21 Beam Systems), 2 Sheets.

Primary Examiner—Richard A. Farley
Attorney, Agent, or Firm—W. G. Dossé; R. D. McBurnett

[57] ABSTRACT

A system for measuring the depth of the ocean, or other body of water, from a moving vessel uses acoustical sounding from the vessel and enables improved bottom definition during high-speed vessel travel. A succession of pulses of different tone frequencies is transmitted from the vessel. The echoes produced when these tone pulses reflect from the water bottom are received at the vessel and are sorted according to frequency. This arrangement assures that the determination of the transit time of a pulse at one frequency is not confused by receipt of an echo at another frequency. The transit times of the several pulses and their echoes are measured for use in determining water depth.

13 Claims, 9 Drawing Figures

FINE-RESOLUTION, WATER-DEPTH MEASURING SYSTEM

TECHNICAL FIELD

The present invention relates to echo ranging to determine the depth of the ocean, or other body of water, using pulses of frequency or tone energy.

BACKGROUND OF THE INVENTION

In echo depth measuring in oceanography, a pulse of energy in the form of a short burst of an audio or ultrasonic tone frequency is sent from a transducer, mounted on a vessel or ship, toward the bottom of the ocean or other body of water. The tone or energy pulse is reflected from the bottom, back toward the vessel where that echo is received by the same or another transducer.

The speed of travel of a tone pulse through ocean water at various temperatures and depths is reasonably accurately known. It is also known that the transit time of such a pulse from the vessel to the bottom and back to the vessel is directly related to the depth of the water under the vessel-mounted transducer.

In order to make gross measurements, e.g., to determine whether the depth at a particular point is a hundred feet or a thousand feet, occasional pulses widely spaced in time are quite adequate. In relatively deep water it may take as much as eight or ten seconds for an echo to return to a vessel-mounted transducer. However, if a ship is traveling at a speed of fifteen knots during the transit period of the pulse and its echo, the vessel may travel as much as 200 to 400 feet before the next pulse of energy is transmitted. This is perfectly acceptable when one is only interested in avoiding an accidental grounding of the vessel.

However, for oceanographic survey, such, for example, as mineral exploration or cable laying, greater accuracy is required than is possible in a system in which sounding pulses are transmitted every 200 feet or more. This usually requires that the ship travel slower, which seriously escalates time and cost required to make a survey, Alternatively, in shallower water, the pulses can be somewhat more frequent. However, in deeper water, where it takes as much as ten seconds for the sounding pulse to travel from the ship to the bottom and for its echo to return to the ship again, soundings at an interval so frequent as to transmit a pulse before receipt of the echo of the prior pulse would tend to confuse the depth recorder.

SUMMARY OF THE INVENTION

In accordance with the present invention, water depth-measuring systems are improved by transmitting toward the water bottom a first pulse of energy at a first frequency and a second pulse of energy at a second frequency and measuring at least a portion of the transit times of the pulses when they return as echoes from the bottom. Transmission of the second pulse follows transmission of the first pulse by a time interval that is shorter than the time interval between transmission of the first pulse and the receipt of its echo.

BRIEF DESCRIPTION OF THE DRAWINGS

The present invention will be more completely understood by reference to the following detailed description when considered in conjunction with the accompanying drawings wherein.

DETAILED DESCRIPTION

Figure 1:
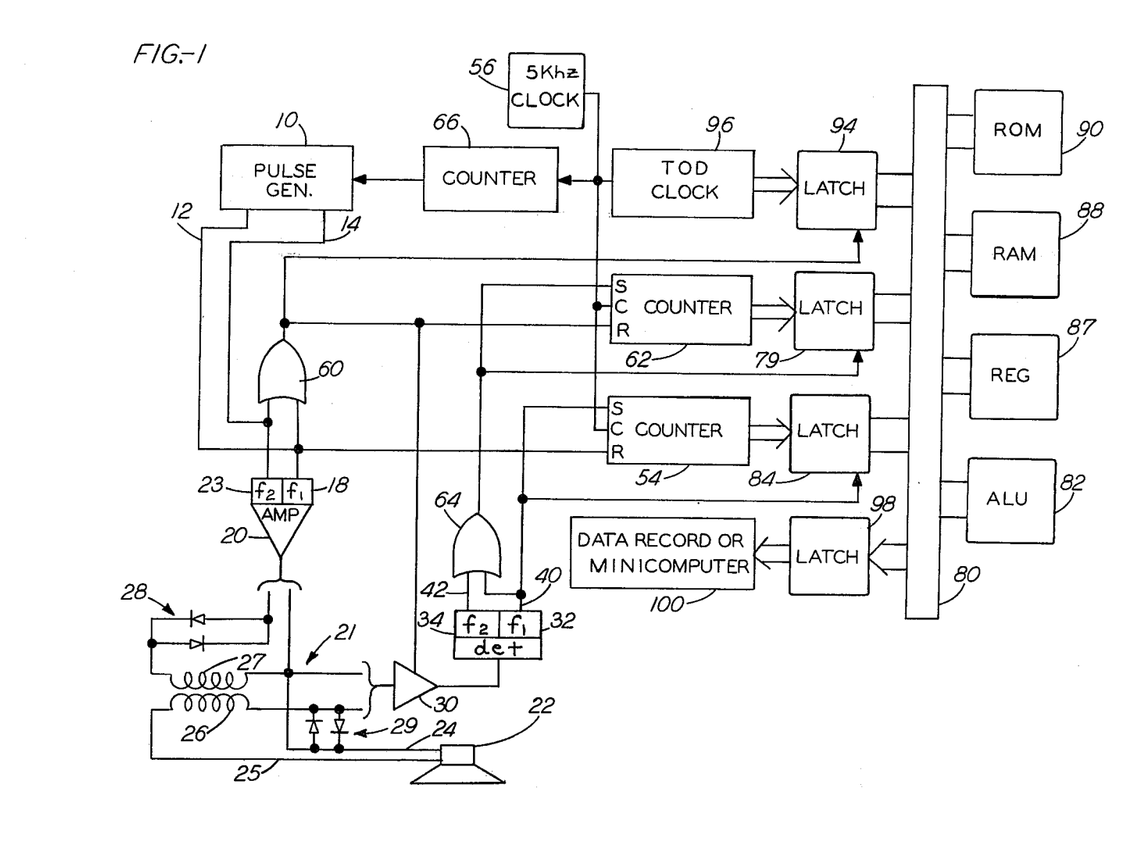
FIG. 1 is a schematic logic diagram of a two-frequency depth sounding system in accordance with the present invention.

Referring now to the accompanying drawings and more particularly to FIG. 1, there is shown a schematic logic diagram of a two-frequency depth sounding system in which tone pulses preferably of either fifteen kilohertz ($f_1$) or sixteen kilohertz ($f_2$) are transmitted from a vessel toward the bottom of the ocean water at a rate of preferably one pulse per second. Transmission of these pulses is triggered by a pulse generator 10, having two outputs, 12 and 14, and which emits one pulse every second, on either the output 12 or the output 14. For surveying in relatively shallow water, the pulses are emitted on outputs 12 and 14 such that each output 12 or 14 emits a pulse every two seconds with the pulses alternating between the two outputs.

The output 12 is connected to the input of an oscillator 18 which, when energized by a pulse from the output 12, issues a short pulse or burst of a tone signal at the frequency $f_1$. The output from the oscillator 18 is connected to an amplifier 20 which amplifies that burst of tone signal to a suitable power level for depth sounding. The output from the amplifier 20 is delivered through a limiting-steering network 21 to a transducer 22 located preferably on the hull of the vessel (not shown). The transducer 22 is preferably located on the vessel in such a way as to direct the pulse of energy downward toward the bottom of the ocean.

The next pulse generated by the pulse generator 10 is emitted on the output 14, which is connected to the input of an oscillator 23 that is tuned to $f_2$. The output of oscillator 23 is connected to an input of the amplifier 20 such that a pulse or burst of tone energy at the frequency $f_2$ is delivered to the transducer 22 for radiation downward from the vessel. The next output from the pulse generator 10 is emitted on the output 12 to repeat the cycle.

The transducer 22 is bi-directional, preferably a piezoelectric crystal. A bi-directional transducer can transmit energy into the water and receive energy from the water, converting it into electrical signals. Electrically, the transducer 22 is a two-terminal device with one terminal 24 being common to the input to and the output from the transducer 22. The other terminal 25 of the transducer 22 is connected to a secondary coil 26 of an audio transformer having a primary coil 27. The output of the amplifier 20 is connected across the primary coil 27 through a pair of oppositely-poled, parallel-connected diodes 28 that form a circuit which is sometimes referred to as a "click suppressor". The click suppressor 28 readily passes a high-voltage tone pulse from the amplifier 20 to the primary coil 27, but echo signals from the ocean bottom cause weak electrical tone signals to be generated by the transducer 22. These weak echo-representing tone signals are of insufficient voltage to cause forward conduction of the diodes of the click suppressor 28. However, such weak, echo-representing electrical signals produced by the transducer 22 are similarly of insufficient voltage to forward bias the diodes of a click suppressor 29, which is connected so as to shunt any signal of more than about 0.7 volts generated across the transducer terminals 24 and 25 and the secondary coil 26. Therefore, any echo-representing signal is easily passed to the input of an amplifier 30. The click suppressor 29 protectively shunts the input of the amplifier 30 to prevent powerful transmitting signals from damaging the input of the amplifier 30.

The output of the amplifier 30 is connected to a pair of tuned detectors 32 and 34 that detect their respective frequences $f_1$ and $f_2$ for sorting the echoes according to frequency. When a detector 32 or 34 detects an echo at its respective frequency, it generates an output pulse on its respective output terminal 40 or 42.

With the bi-directional transducer 22, the network 21 and its associated amplifiers 20 and 30 comprise a transmitter-receiver.

Figure 2A:
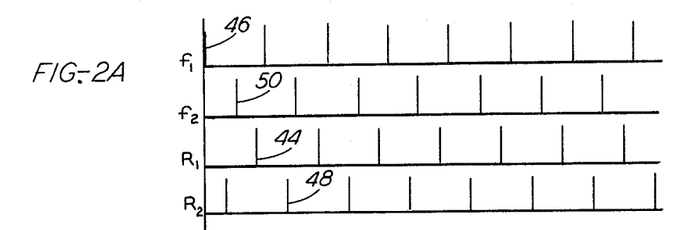
FIGS. 2A and 2B are timing diagrams of typical arrangements of depth sounding pulses transmitted by the system of FIG. 1.

Referring now to FIG. 2A, there is shown an example of the operation of the system wherein the pulse generator 10 causes tone pulses of energy at the frequency $f_1$ to alternate in time with pulses of tone energy at frequency $f_2$. The pulses shown on the waveform marked $R_1$ in FIG. 2A correspond to the returns or echoes received and recognized at the frequency $f_1$. Similarly, the pulses shown in the waveform labelled $R_2$ in FIG. 2A represent the receipt of returning echoes at the frequency $f_2$.

This simple example of alternating frequencies is useful only for relatively shallow depths, the limitation being that a pulse of energy must reach the bottom and return to the transducer as an echo within the time period that elapses between successive pulses of energy at the frequency $f_1$, in this example, two seconds.

Referring again to the waveforms of FIG. 2A, the pulse designated by the reference number 44 represents the echo at the frequency $f_1$ of the pulse 46 that was earlier transmitted toward the bottom. Similarly, the pulse 48 represents the echo of the transmitted pulse 50.

Typically, the pulses of energy transmitted from the transducer 22 (FIG. 1) toward the bottom of the ocean are of exceedingly short duration compared with the period of time that elapses between successive pulses of energy transmitted. Therefore, statistically, there is only a very small likelihood that an echo will be received simultaneously with the transmission of an energy pulse. However, this can be interpreted by subsequent processing of the data to recognize the absence of an echo, and it can be assumed that the missing echo had a transit time equal to an integral number of the pulse repetition periods of the pulse generator 10.

Referring again to FIG. 1, in order to measure the transit time that elapses as a pulse of energy travels from the transducer to the bottom of the ocean and the echo returns to the transducer, the output 12 from the pulse generator 10 is connected to the reset or start input of a multi-stage counter 54. Each time that a pulse of energy at the frequency $f_1$ is transmitted by the transducer 22, the counter 54 is reset to zero and begins counting. The counter 54 counts clock pulses from a clock 56 which preferably delivers very accurately timed output pulses at a frequency of five kilohertz. The output of the clock 56 is delivered to the count input of the counter 54, and the counter 54 continues running and counting five kilohertz pulses until the $f_1$ detector 32 recognizes the receipt of an echo at the frequency $f_1$. The detector 32 then sends a pulse from its output 40 to the stop input of the counter 54 to stop the counter 54 at whatever count it had reached since the last reset pulse from the output 12 of the pulse generator 10. The count reached by the counter 54 then corresponds directly to the transit time of the pulse of energy from the transducer to the bottom and back again to the transducer.

The outputs 12 and 14 of the pulse generator 10 are connected to an OR-gate 60 such that either of the outputs 12 or 14 from the pulse generator 10 can reset and start a counter 62. The counter 62 is similarly arranged to count the output pulses from the clock 56 until such time as the counter 62 is stopped by a pulse issuing from another OR-gate 64 which has two inputs connected to the outputs 40 and 42 of the $f_1$ and $f_2$ detectors 32 and 34, respectively. Therefore, transmission of either frequency $f_1$ or $f_2$ from the transducer is coincident with the reset and starting of the counter 62, and the counter 62 is stopped upon receipt of an echo at either frequency $f_1$ or $f_2$ and thus actually measures only the final, fractional-second portion of the transit time of a pulse and its echo.

The pulse generator 10 very accurately issues a pulse every second. This accuracy is preferably maintained by a modulo-5000 counter 66 which is driven by the very accurate clock 56. Since the counter 62 is reset each second, its output is only useful to measure fractions of a second but facilitates depth calculation when used with the output from the counter 54. Using the 5-Khz clock 56, the counter 62 counts from 0.0000 seconds to 0.9998 seconds in 0.0002-second increments. Therefore, the output of the counter 54 need be used only to measure integral numbers of seconds. The contents of the two counters, added together, is then an accurate measure of energy-pulse transit time and thus depth.

Figure 2B:
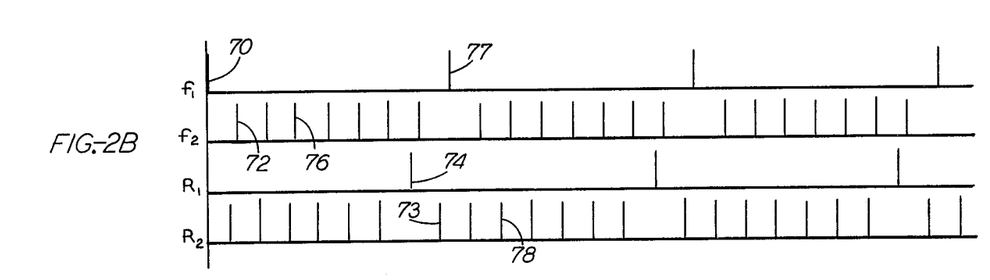

Referring now to FIG. 2B, in the system of FIG. 1, the pulse generator 10 is arranged to issue every eighth pulse at its output 12 and the intervening seven pulses at the output 14. This arrangement is used in deep water in which a pulse of energy requires several seconds to travel from the transducer to the bottom and back to the transducer. The criterion for the choice of whether to use the $f_1$ frequency every other, every fourth, or every eighth pulse is that the echo of the pulse of energy at $f_1$ must return to and be received by the transducer before the next pulse of energy at $f_1$ is transmitted. It can be seen from FIG. 2B that pulses of energy at $f_1$ are transmitted every eight seconds (eight-second period) rather than every two seconds, thereby permitting surveying of water four times as deep as in the example illustrated in FIG. 2A, at the same vessel speed and with the same degree of survey detail.

The ability to switch the pulse generator 10 from the example of FIG. 2A to the example of FIG. 2B, or some intermediate arrangement such as an $f_1$ pulse every fourth pulse, is preferably controlled from an operator panel (not shown); and these arrangements can be manually selected. The selection of the example of FIG. 2A, FIG. 2B, or otherwise can readily be accomplished by a steering gate system which simply decodes the outputs of one, two or three bistable multivibrators (flip flops) connected in cascade to form a binary counter. The manual selection from the operator panel can accomplish selections based upon the state of only the first stage of that binary counter in the example of FIG. 2A or three stages of the binary counter in the example of FIG. 2B.

Referring again to FIG. 2B and the pulse generator 10 of FIG. 1, a pulse from the output 12 of the pulse generator 10 resets and starts the counter 54 and causes the transducer 22 to transmit a pulse of energy at frequency $f_1$. The counter 54 continues running until an echo at $f_1$ returns and is received.

Subsequent to the transmission of the pulse of energy at $f_1$ and within the time interval prior to the transmission of another $f_1$ pulse, the next pulse from the pulse generator 10 is produced at output 14 and causes a pulse of energy to be transmitted by the transducer 22 at the frequency $f_2$. Transmission at $f_1$ or at $f_2$ is accompanied by a pulse passing through the OR-gate 60 to reset and start the counter 62.

Referring again to FIG. 2B, it is noted that the present two-frequency depth sounding system will not normally be used at exceedingly shallow depths where an echo would normally return after a transit time of less than one second. Also, the number of intervening or successive $f_2$ pulses is chosen such that the echo of each $f_1$ pulse returns before transmission of the succeeding $f_1$ pulse. Therefore, an echo pulse at $f_1$ may but won't normally return to the transducer in the time interval between the transmission of an $f_1$ pulse 70 and the transmission of the next succeeding $f_2$ pulse 72. Similarly, the return of an echo of any pulse entails a transit time greater than the period between the transmission of one $f_2$ pulse and transmission of the succeeding $f_2$ pulse. In a typical example, the $f_1$ pulse 70 might be transmitted and its echo 74 not be received until as many as six or seven $f_2$ pulses have been transmitted, but echo 74 would normally be received before transmission of the succeeding $f_1$ pulse 77. Additionally, the $f_2$ pulse 72 might not result in a received echo 73 until after as many as six or seven more succeeding $f_2$ pulses have been transmitted. Similarly, the $f_2$ pulse 76 might not result in a received echo 78 until after six or seven more succeeding $f_2$ pulses and the $f_1$ pulse 77 have been transmitted.

Referring again to FIG. 1, a pulse from the pulse generator 10 on either of the outputs 12 or 14 passes through the OR-gate 60 and resets and starts the (fractions of a second) counter 62. The next receipt of an echo at either $f_1$ or $f_2$ causes a pulse to be generated at the detector output 40 or 42 which passes through the OR-gate 64 and stops the counter 62 and triggers an operation to record the contents of the counter 62.

The contents of the counters 62 and 54 could be transferred, at appropriate times, to storage registers and then to a storage medium for later manual or automatic processing for mapping the ocean bottom. Preferably, the transfer of the counter contents is done by a microprocessor under stored program control. The counter contents and related data are then stored or calculated "on line" by a minicomputer, preferably capable of real-time ocean bottom mapping. The specific manner of transferring, storing, or processing the counter contents and related data form no part of the present invention. However, for completeness, the transfer operation is described herein in conjunction with the present invention.

When an echo is received at either $f_1$ or $f_2$, the output from the OR-gate 64 not only stops the counter 62 at the count representing the (fractional-second) time interval from the last pulse transmitted by the transducer 22 but also sends a control signal to a latch 79 that stores the contents of the counter 62. The latch 79 then puts a data-available signal onto the bus 80 of a microprocessor, preferably an Intel 8080.

To prevent a transmitted pulse from causing operation of the latch 79, the output from the OR-gate 60 is connected to an inhibit input to the amplifier 30. Therefore, whenever a pulse is transmitted, the detectors 32 and 34 are temporarily blinded.

The structure of the bus 80 is of three groups of parallel conductors, each conductor having possible interconnections to any or all logic or functional components interacting with the microprocessor. The three groups of conductors of the bus 80 are called the data bus, the control bus, and the address bus. The output from the latch 79 puts a data-available signal on the control bus of the bus structure 80. An arithmetic logic unit (ALU) 82 within the microprocessor responds to that data-available signal and operates according to a stored program to store and transfer the counts that represent the transit time of the energy pulse, the echo of which was just received.

Two binary coded decimal (BCD) digits from the last time the counter 54 was stopped, indicate whole or integral numbers of seconds of transit time. Each BCD digit comprises four binary bits. Therefore, the contents of the counter 54 can be expressed as one eight-bit binary byte.

Similarly, only when a $f_1$ echo is received, the $f_1$ detector 32 issues a signal on its output 40 to a latch 84 to store the contents of the counter 54. Actually, if an $f_1$ echo is received, both latches 70 (through the OR-gate 64) and 84 are operated. However, when only an $f_2$ echo is received, only the latch 79 is operated.

As soon as the count from the counter 62 is stored in the latch 79, the ALU 82 causes the contents of the latch 79, which are present on the data bus portion of the bus structure 80, to be stored in a register 87 which is a part of the microprocessor. The ALU 82 then issues an acknowledgment on the control portion of the bus 80 to the latch 79. The contents of the register 87 are present on the data bus portion of the bus 80 and are thus delivered to every data connection to the bus 80.

The contents of the register 87 are then stored in a random-access memory (RAM) 88 under command on the control bus from the ALU 82. The count data from the register 87 are stored at an address that is sent from the ALU 82 on the address bus. All of this is under command from a stored program permanently present in a read-only memory (ROM) 90 which from time to time delivers program instructions as requested by the ALU 82.

The counter 62 counts only fractional seconds to four decimal places in BCD, and the output from the counter 62 is used to facilitate depth measurement by combination with the output from the counter 54. The portion of the total count to "the left of the decimal point" is developed in the counter 54, which may still be running while most of the $f_2$ echoes are received. However, the prior count from the counter 54 that was stored after the prior $f_1$ echo is still available in the RAM 88. Therefore, a complete transit time is always stored in the RAM 88.

However, if the echo signal is at the frequency $f_1$, the contents of the counter 54 is also stored. Therefore, in response to a pulse at output 40 the contents of the counter 54 is stored in the latch 84. The contents of the latch 84 is then present on the data bus and is stored in the register 87, following which it is transferred to an appropriate address location in the RAM 88, then, the contents of the latch 79 are stored at the next RAM addresses to complete the transit time statement. If the echo was at $f_2$ and not $f_1$, the former contents of the first RAM address are unchanged and are simply reused with the new information from the counter 62.

After the contents of the counter 62 have been stored via the latch 79, the register 87, and in the next addresses of the RAM 88, the ALU 82 addresses a latch 94 which store the contents of a time-of-day (TOD) clock 96 which is driven with great accuracy, to the whole second, by the 5 Khz clock 56. The time-of-day data are stored in the latch 94 each second on command from the OR-gate 60. These TOD data are also moved to the register 87 and then directly to an output latch 98, where they are available for recording or processing by a data record or minicomputer 100. After the data record or minicomputer 100 acknowledges the TOD data via the latch 98, the transit time contents of the RAM are transferred via the register 87 and latch 98 to the data record or minicomputer 100. The TOD data are used to correlate vessel location with depth sounding transit time.

It is noted that quite a few microprocessor steps take place after receipt of an echo. However, these steps in no way interfere with depth sounding and counter operation. The microprocessor typically executes its instructions in response to a two megahertz clock, whereas the clock 56 only issues pulses every 200 microseconds.

Figure 3:
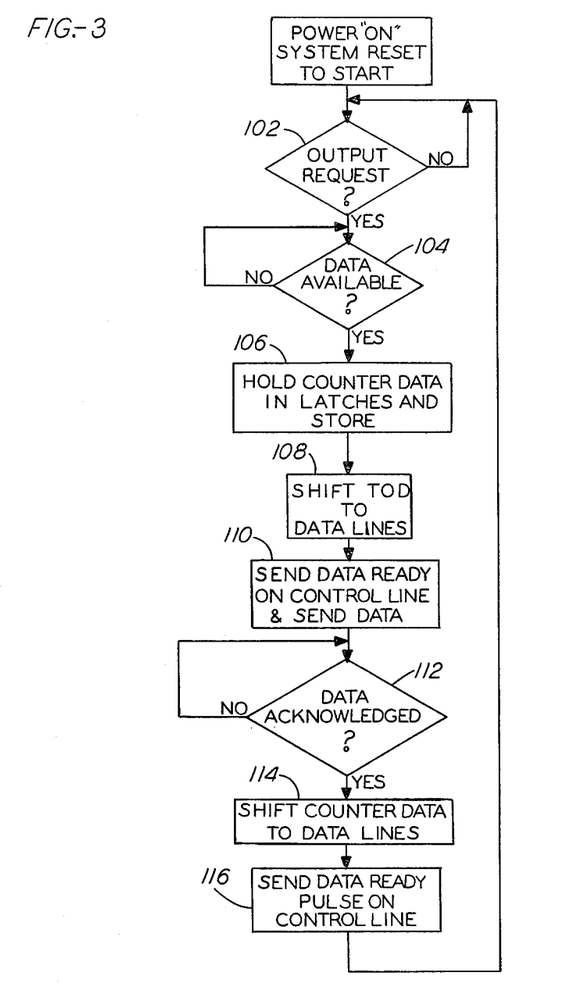
FIG. 3 is a logic flow diagram for operation of a microprocessor used to time and trigger various operations in the system of FIG. 1.

Referring now to FIG. 3, there is shown a program logic flow diagram which can be used by any skilled programmer to write the sample program for the ROM 90 to instruct the ALU 82 in its transfer of the contents of the counters 54 and 62 and the TOD clock 96 to the data record or minicomputer 100.

The first operation of the program is initiated by a power-on signal which turns on the power supply and the microprocessor, including the ALU 82 and the external but associated ROM 90. The first decision 102 causes the ALU 82 to examine the control bus for an inquiry from the data record or minicomputer 100 via the latch 98. If there is no data inquiry (a request for data), the ALU 82 goes into a closed loop repeating the interrogation until an inquiry or data request from the data record or minicomputer 100 is present on the control bus.

When a data request from the data record or minicomputer 100 is present, the program advances to the next decision 104 which instructs the ALU 82 to examine the control bus looking for a data-available signal from the latch 79 which indicates that an echo at either frequency has been received. If the answer to that inquiry is negative, the ALU 82 goes into a short loop continually looking for a data-available signal from the latch 79. When the ALU 82 senses a data-available signal from the latch 79, it advances to the next program logic step 106 which is actually a series of three sequential operations in combination with the succeeding logic step 108. Initially the latch 84 is interrogated if it is sending a data-available signal on the bus 80, followed by a transfer of the data (if available) from the latch 84 to the register 87 and then to the first of a block of storage addresses in the RAM 88. Next, the latch 79 is interrogated, to store in the register 87 and then at the next address of the RAM 88, the first two decimal digits of this four-decimal count representing the fractional-second contents of the counter 62. Then, the second pair of decimal digits is transferred as an eight-bit byte from the latch 79 into the register 87 and then to the third memory location in the RAM 88.

The next operation is to transfer the six-decimal-digit number contents of the TOD clock 96 from the latch 94 first to the register 87 and then to the latch 98. When these transfer operations have been completed, the logic step 110 (FIG. 3) causes a data ready signal to be impressed by the ALU 82 on the control bus 80 so as to apprise the data record or minicomputer 100 that data are now available for recording or processing. This transfer from the latch 94 ultimately to the data record or minicomputer 100 can be a sequence of three eight-bit bytes.

The decision instruction 112 causes the ALU 82 to look at the control bus for a data acknowledged signal from the data record or minicomputer 100. If no such acknowledgement is received, the ALU 82 goes in a small loop constantly looking for an acknowledgement according to step 112. When an acknowledgement from the data record or minicomputer 100 is received, the ALU progresses to the next program steps from the ROM 90 to transfer from the RAM 88 to the output latch 98 one byte at a time, the three bytes representing the transit time of the echo. After each such transfer of one byte to the latch 98 a data-ready signal is sent to the data record or minicomputer 100. These are shown as the instruction steps 114 and 116 of FIG. 3. While not shown in FIG. 3, any skilled programmer would know that the sequential nature of the transfer of the data from the RAM 88 to the latch 98 for subsequent transfer to the data record or minicomputer 100 presupposes a loop depending upon an acknowledgement sent on the control portion of the bus 80 from the data record or minicomputer 100 to indicate to the ALU 82 that it can proceed with the next transfer in the sequence.

When the last byte of the echo transit time count has been acknowledged by the data record or minicomputer 100, the program proceeds to the beginning to repeat the cycle.

SECOND EMBODIMENT

All components of FIG. 4 that are identical to and perform the identical function described in connection with FIG. 1 are referred to by the same reference numbers used in FIG. 1 to designate those same components. Any component of FIG. 4 that is different in any substantial way or performs a different function than it performed in FIG. 1 is referred to by a new reference number.

Figure 4:
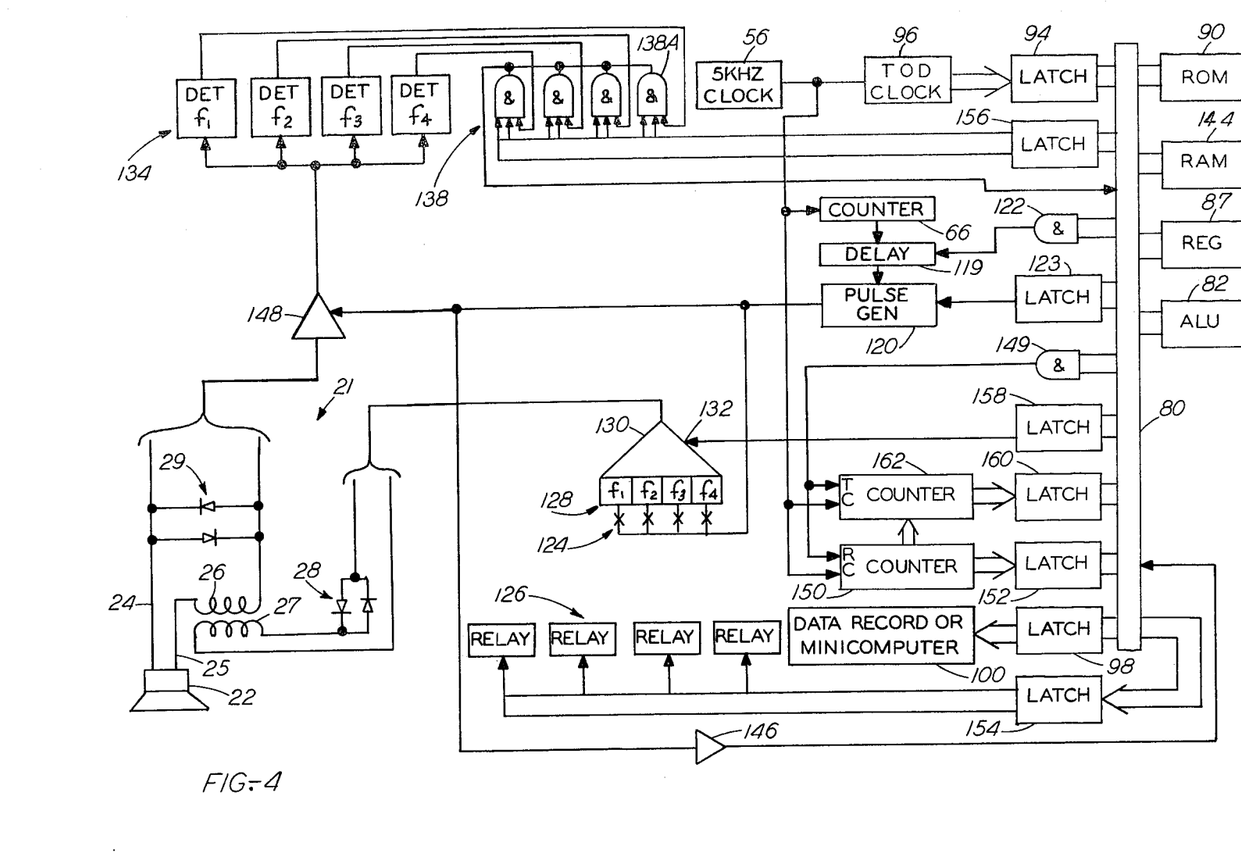
FIG. 4 is a schematic logic diagram of a four-frequency depth sounding system in accordance with the present invention.

Referring now to FIG. 4, the five-kilohertz clock 56 again controls the timing of the depth sounding system. The output from the clock 56 is sent not only to the time-of-day clock 96 but also to the counter 66 as in the case of the two-frequency system of FIG. 1. The modulo-5000 counter 66 generates very accurately-timed pulses at a period of one second. These one-per-second pulses are sent through a variable delay 119 to the pulse generator 120. The variable delay 119 only delays the signal from the counter 66 to the pulse generator 120 by a fixed time interval in response to a signal from an AND-gate 122. Absent any delay signal from the AND-gate 122, as described below, the one-per-second pulses from the counter 66 are merely passed through the delay circuit 119 without delay and to the pulse generator 120. The pulse generator 120 generates a pulse in response to each signal that it receives from the counter 66. The duration of the pulses generated by the pulse generator 120 is controlled by the ALU 82 which sends signals on the bus 80 to determine the output of a latch 123. The output of the pulse generator 120 is sent to four steering switches 124 which are normally-open relay contact pairs, only one of which is closed at any given time. The selection of one out of the four steering switches 124 is under the control of four relays 126, the functioning of which will be described below. The output from the pulse generator 120 is sent through the one closed steering switch 124 to an associated one of four oscillators 128. These four oscillators 128 are tuned each to a different frequency $f_1$, $f_2$, $f_3$, or $f_4$, giving the possibilities for four different frequencies of depth sounding pulse. The outputs from the four oscillators 128 are connected to a controllable amplifier 130, the amplification of which is controlled by an input 132. Therefore, the magnitude of the tone pulses can be varied under control of the ALU 82. The output of the amplifier 130 is delivered to a limiting, steering network 21 which is identical to that disclosed in connection with FIG. 1. Also, the transducer 22 is identical to that used in connection with FIG. 1. Echo signals received by the transducer 22 are passed through the limiting-steering network 21 and are amplified by an amplifier 148 as in the case of FIG. 1. The output from the amplifier 148 is fed to four detectors 134, each of which is tuned to a different one of the four frequencies of the oscillators 128.

Unlike the situation in FIG. 1 in which any echo signal is detected and then processed to stop an associated counter or counters, in the circuit of FIG. 4, the microprocessor controls four AND-gates 138 in order to be responsive to only that echo which is expected in any given limited time window. Therefore, depending upon which frequency of echo is expected by the microprocessor, only the associated one of the AND-gates 138 is enabled to pass a detected signal from its associated one of the four detectors 134. In response to the associated echo frequency, the enabled AND-gate 138 passes the detected signal from its associated one of the detectors 134 to the control bus of the bus structure 80, causing the ALU within the microprocessor to begin a recording operation. The duration or width of the echo pulse is sensed either by the microprocessor or in the AND-gates 138 under control of the latch 156 to avoid recognition of spurious signals.

Figure 5:
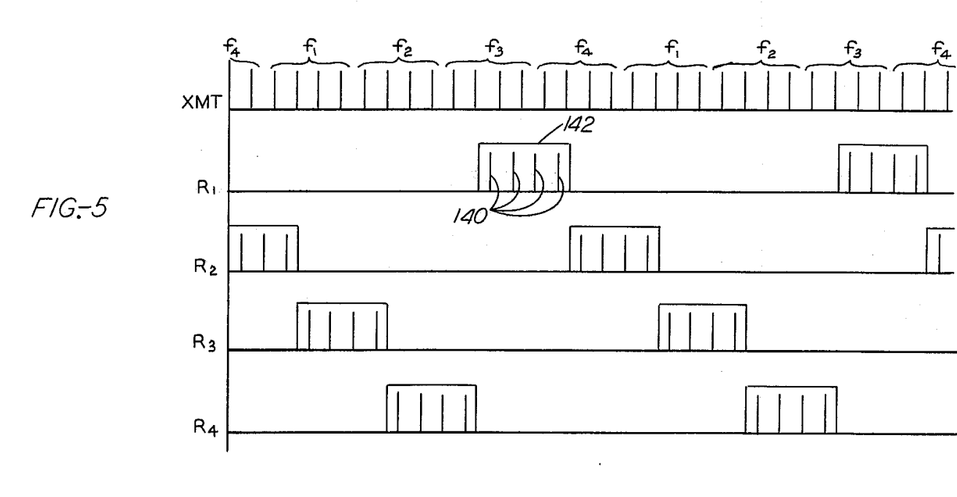
FIG. 5 is a timing diagram of a typical arrangement of depth sounding pulses transmitted by the system of FIG. 4.

Before proceeding with a description of the operation of the depth-determining counters, it will be helpful to refer to FIG. 5. Referring to the waveform of FIG. 5 that is marked XMT, four pulses are transmitted by the transducer 22 at the frequency $f_1$ and then four pulses are sent at the frequency $f_2$ followed by four at $f_3$, four at $f_4$, and then four again at $f_1$ to repeat the cycle. While four pulses of each frequency are shown, this is actually the maximum number necessary for depth sounding anywhere in the ocean. In shallower depths, three pulses at each frequency or two or even only one pulse at each frequency may be sufficient. The four waveforms marked $R_1$, $R_2$, $R_3$ and $R_4$ in FIG. 5 represent the echoes or returns at these four frequencies. The four pulses 140 represent returning echoes at the frequency $f_1$, that result from the first four $f_1$ pulses shown on the XMT waveform. The four echo pulses 140 are shown under a rectangular pulse 142 which represents the enablement period of the $f_1$ detector AND-gate 138A of FIG. 4. Thus, during the pulse 142 of FIG. 5, the AND-gate 138A is enabled and each of the four $f_1$ echo pulses 140 causes a signal to pass through the gate 138A to the bus 80 to indicate to the ALU 82 that an echo has been received. The waveforms $R_2$, $R_3$, and $R_4$ are analogous to the waveform $R_1$ but for the frequencies $f_2$, $f_3$, and $f_4$. In response to each echo-representing signal, the ALU 82 initiates a recording operation for calculating and recording the transit time of the pulse and for recording the time of day for use by the data record or minicomputer 100.

Returning again to FIG. 4, when the microprocessor that includes the ALU 82 recognizes under control of the program from the ROM 90 that an energy pulse is about to be transmitted from the transducer 22, the ALU 82 interrogates the associated RAM 144 to determine if an echo is simultaneously expected at the transducer 22. If an echo is simultaneously expected, the AND-gate 122 is energized and sends a control signal to the delay 119 so as to delay the transmission of the energy pulse via the transducer 22 for a fixed time period sufficient to assure that the expected echo signal will be received. The purpose of this transmission delay feature is to prevent transmission of an energy pulse at the same instant or simultaneously with the receipt of an echo. If such simultaneous transmission and reception were to occur, the echo would be disregarded, as explained in connection with the system of FIG. 1. When the pulse generator 120 issues a command pulse to one of the oscillators 128, it also sends a signal through a wave-shaping amplifier 146 to the bus 80 so as to signal the ALU 82 the transmission of the energy pulse. The signal from the pulse generator 120 is also sent to the inhibit input of the amplifier 148 which amplifies the echo signals for use by the detectors 134. Therefore, the detectors 134 are blinded whenever a pulse of energy is transmitted into the water by the transducer 22.

As illustrated in the XMT waveform of FIG. 5, there are up to four pulses of energy transmitted at each of four frequencies. These transmissions are all sequential. Arbitrarily, the start of one cycle is taken at the instant of transmission of the first of the sequence of up to four pulses of energy at the frequency $f_1$. Since transmission of an $f_1$ pulse is the start of a depth sounding cycle, the transmission of that $f_1$ pulse is noted by the ALU 82 via the amplifier 146 and the data stored in the RAM 144. When the first $f_1$ pulse is transmitted, the ALU 82 causes the AND-gate 149 to send a signal to the reset input of a counter 150. At each successive transmission of a pulse of energy, the ALU 82 causes a latch 152 to record the count then present in the counter 150. The contents of the latch 152 are then transferred to the register 87 and then to the RAM 144. Thereafter, the time-of-day data from the TOD clock 96 are recorded in the latch 94 an then stored in the RAM 144 via the register 87. With this, of course, is stored a representation that this is the transmission of the second (or third, etc.) $f_1$ pulse of a cycle. Each time that a pulse of energy is sent, the contents of the counter 150 are stored in the RAM 144 with the time of day of that transmission plus the indication of the identity of that pulse first $f_2$ or third $f_3$ pulse, etc.

Meanwhile, receipt of echo pulses is similarly noted by the ALU 82 via one of the AND-gates 138 and the bus 80. Upon receipt of an echo, the ALU 82 causes a latch 160 to store the momentary contents of a second counter 162 to facilitate calculating the transit time and thus the water depth. This count is then transferred to the register 87 or another of the microprocessor's registers. As explained below, the count representing the time of receipt of an echo will be taken from the counter 150 and the latch 152 if a succeeding first $f_1$ pulse has not yet been transmitted. In either alternative, the ALU 82 then substracts the count that represents the transmission time for a given pulse from the count that represents the time of receipt of the associated echo. The difference is then representative of the transit time of the energy pulse. This difference count is then sent via the bus 80 and the output latch 98 to the data record or minicomputer 100 along with the time-of-day data associated therewith.

Two counters 150 and 162 should be used because at least some of the echoes of some of the later pulses at the frequencies $f_3$ and $f_4$ will be received after transmission of the next succeeding $f_1$ pulse. It is desirable to start the counter 150 at the start of a cycle of the four frequencies. Consequently, at the beginning of one cycle, the counter 150 is started. The latch 152 is used to record the contents of the counter 150 each time a pulse is transmitted until such time as the ALU 82 under program control determines that the last $f_4$ pulse in a cycle of sounding pulses has been transmitted. When the first $f_1$ pulse of the next cycle is transmitted, a signal from the pulse generator 120 is shaped by the amplifier 146 and sent to the bus 80 where it signals the ALU 82 which energizes the AND-gate 149 under program control. The output of the AND-gate 149 is then sent to a reset input of the counter 150 and to a transfer input of the counter 162. Therefore, when the first $f_1$ pulse of a cycle is transmitted, the contents of the counter 150 are transferred to the counter 162, and the counter 150 is reset for the new cycle or sequence of transmitted pulses. Therefore, the receipt times of echoes are derived from the counter 150 until the succeeding first $f_1$ pulse is transmitted, following which, the receipt times of echoes are derived from the counter 162 until the last $f_4$ echo of a cycle is received. Following receipt of the last $f_4$ echo of a cycle, echo receipt times are again derived from the counter 150, until its contents are again transferred to the counter 162 upon transmission of the first $f_1$ pulse of the next cycle.

Since the ALU 82 with the RAM 144 now keeps track of which pulse is being transmitted and which pulse is about to be received, a latch 154 is used to control the relays 126 from the ALU 82 so as to determine the frequency of each energy pulse. Similarly, the ALU 82 sends data on the data bus 80 to a latch 156 to control the AND-gates 138 to pass an echo representation of only an echo at the frequency that is anticipated.

As mentioned previously, the amplifier 130 has an amplification control input 132 which is controlled by another latch 158 that also periodically receives data from the data portion of the bus 80 to control the amplification of the amplifier 130. In this way, the ALU 82 controls the amplitude or energy strength of the energy pulses at an arbitrary level depending upon the depth of water underneath the vessel.

Figure 6A:
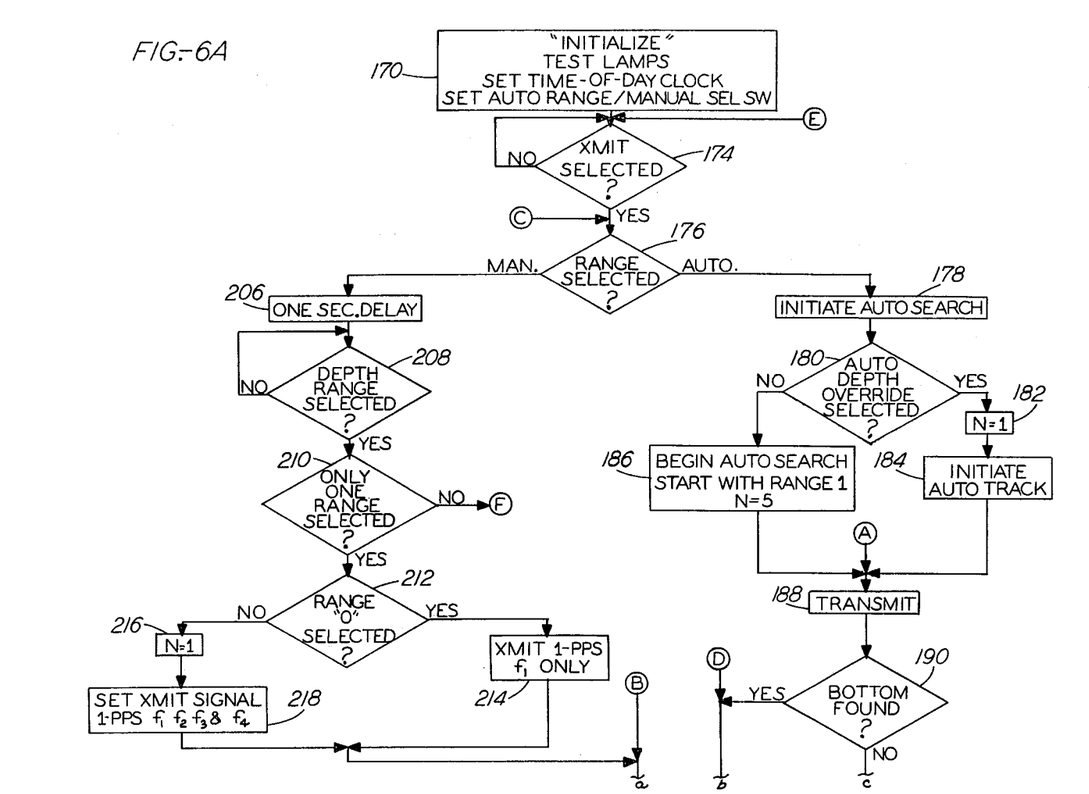
FIGS. 6A and 6B are a single logic flow diagram for operation of a microprocessor used to time and trigger various operations in the system of FIG. 4.
Figure 6B:
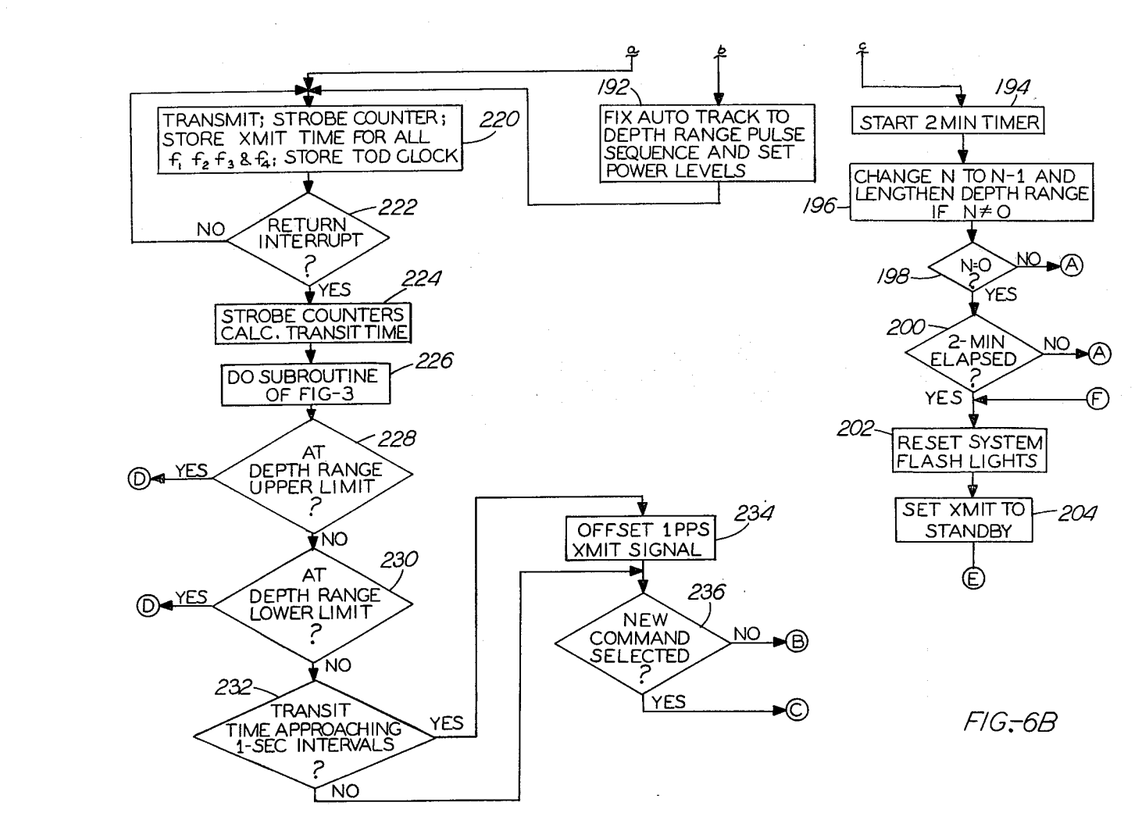
Figure 7:
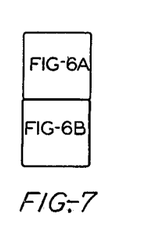
FIG. 7, on the same sheet as FIG. 5, is a diagram illustrating the arrangement of FIGS. 6A and 6B.

Referring now to the accompanying program flow chart FIG. 6, which has been arbitrarily separated into two sheets, FIG. 6A and FIG. 6B, the flow chart indicates the logic operations which any skilled programmer can use to prepare a program for storage in the ROM 90 to control the ALU 82 to perform the transfer and logic functions set forth above.

When power to the system is turned ON, the initialization block 170 signifies a series of combined manual and logic operations to test the lamps of the operating panel (not shown) of the system as well as to set the time-of-day clock 96 (FIG. 4) to the correct time and to select whether the range of depth of the sounding device will be manually selected or automatically determined by the logic system. Also, a switch must be set to determine whether the system is to begin transmitting or whether it is simply to stand by and await some further manual input.

The first decision 174 made by the logic is to determine whether or not the transmit mode has been selected. If the transmit mode has not been selected and the system has been put in the stand-by mode, the logic system merely runs in a short loop constantly looking for the setting of the manual switch from the stand-by mode to the transmit mode.

As soon as the switch is noted to be in the transmit mode, the program progresses to the next decision 176 to determine if the range of depth at which the system is to survey the ocean bottom is to be manually selected or automatically selected. If the range selection is in the automatic mode, the program branches into the first step of a subroutine to initiate an automatic search (block 178) for the appropriate range of depth. The next logic step of the automatic search subroutine is a decision (block 180) to determine if a manual indication was made on the panel front as to where to start looking for the ocean bottom (in what range of depths).

If a manual auto depth override was selected, the logic system will only make one attempt to find the bottom of the ocean within the depth range preselected. Therefore, the block 182 sets a counter (block 182) to $N=1$ which determines that the logic will only make one attempt to find the ocean bottom within the range preselected. Block 184 causes the initiation of the depth sounding pattern of pulses at various frequencies and repetitions corresponding to the depth range selected.

If the decision 180 indicates that the auto depth override is not selected and that there is no manual preselection of the first attempt at depth selection, the subroutine branches to block 186 which starts the search at a depth range designated "Range 1" which causes transmission of all four frequencies in sequence (but with no repetition of each frequency) to see if the bottom is found by an echo that returns within the four-second time frame corresponding to the transmission of one pulse at each of the four frequencies.

The counter indicated in block 182 is set to a count of $N=5$ to indicate that five attempts will be made to find the bottom at different ranges in an effort to find the correct range.

Either starting branch of the automatic depth subroutines meets in a block 188 which is a subroutine that looks for a feedback signal on the control bus 80 (FIG. 4) from the output of the amplifier 146 and the pulse generator 120 and recognizes the transmission of one-second-repetition-rate sounding pulse incident thereto. After each transmission of a sound pulse as recognized by the logic corresponding to the block 188, a decision 190 is made.

In order to better understand the flow chart of FIG. 6, the ranges are defined. Range 0 is defined as the depth corresponding to an echo received within one second. In range 0 only $f_1$ pulses are sent from the transducer.

Range 1 corresponds to a depth at which an echo will return within four seconds. In range 1, one pulse is sent at each of the four frequencies. Range 2 corresponds to the depth within which an echo will return within eight seconds. In range 2 each frequency is sent twice in succession before progressing to the next frequency. The ranges 3, 4, and 5 relate to pulse patterns corresponding to progressively more repetitions of each frequency pulse before progressing to the next frequency (see FIG. 5). Arbitrarily, the auto search always starts in range 1 with sequential transmission of one pulse at each of the four different frequencies.

The decision point 190 in the program involves logic necessary for deciding in one transmit sequence of all four frequencies (corresponding to a cycle) of operation of the system, whether an echo was returned from that sequence or during that time period. If the bottom was found within one transmit sequence, it indicates that the range scale selected by the block 186 is correct, and the logic can proceed to sounding the ocean depth for purposes of making the final record.

Therefore, if the bottom is found in the depth range time frame, the program goes on to block 192 which encompasses logic necessary to fix or predetermine the arbitrary power level and the pulse sequence that will be used by the system for that depth range. The logic of block 192 determines the output from the latch 158 as well as the sequence of operation of the latches 154 and 156. The latch 158 and the latch 154 control the sequence of frequency pulses transmitted and received as well as the operation of the AND-gate 149 to determine when the contents of the counter 150 are transferred to the counter 162. Once all these sequences are established, the program can go on to its normal operation.

If the bottom was not found in the range time frame, the decision block 190 causes the program to branch to a block 194 rather than the block 192. The block 194 starts a two minute timer which resets the system at the end of two minutes if the bottom search fails to find bottom. Then, the program progresses to a block 196 which decrements the attempt number "N" by one and also lengthens the range by one unit, provided that the newly decremented attempt number "N" is not "0". At the next step of the subroutine, a decision block 198 determines if the new attempt number "N" is "0". If not, the subroutine goes in a loop indicated by the encircled letter "A", to make another attempt at finding the ocean bottom. If N=0, indicating that no further tries should be made, the decision block 198 progresses to another decision block 200 which interrogates the two-minute timer. If the two minutes have not yet elapsed, the program again goes in a loop indicated by "A" to make another attempt to find the bottom without changing the depth range.

In each recycling of the loop A, the two-minute timer block 194 must not be restarted, otherwise the whole purpose of the two-minute timer—to limit the time wasted by the system in futile attempts to find the bottom—will be defeated.

If the two-minute decision 200 indicates that the two-minute time has elapsed, the software resets the system by progressing to loop "E" and by flashing front panel lights controlled by block 202 to indicate to the operator that something has gone wrong. The transmitter is set to stand-by in the next block 204, and the program then resets back to the point "E" above the block 174 and goes into a short loop waiting for the operator manually to select the transmit mode.

Returning again to the decision point 176, it is assumed that the manual branch of the range control subroutine is selected. If the manual range is selected, the decision 176 routes the logic to a one-second delay 206 which merely permits the system transients to dissipate before attempting any further program steps, since the selection 174 and 176 can be made so fast after the system initialization 170. After the one-second delay 206, a decision 208 checks to see if the operator has in fact manually selected a depth range. If there has been no manual selection, the program goes in a loop until a depth range is selected. If the operator did manually select a range, the program advances to a decision 210 which determines if only one range was selected. If more than one depth range was selected, the program branches at point "F" forward to the alarm sequence including the blocks 202 and 204 and ultimately to the reset of the system.

If only one range was selected, a decision 212 determines if this range was the "0" range. The "0" range corresponds to a depth at which an echo will be received within one second, and only the frequency $f_1$ is used. If the "0" range was found at the decision 212 to have been selected, the program branches to a block 214. Like the block 192, the block 214 fixes the program but with only the transmission of $f_1$ pulses and only at the lowest power setting, in order to sound only shallow depths.

If a range other than "0" is selected, the program branches to a block 216 which sets the counter N=1 (as did the block 182). The program then advances to a block 218 which is a step which fixes the transmitted power level and the transmitting sequences at one pulse per second for the number of repetitions of each frequency in a sequence in accordance with the range switch manually selected by the operator. This function is just like that performed by the block 192.

Any one of the program blocks 192, 214 or 218 is exited to the block 220 which starts that portion of the program resulting in the gathering of depth data for plotting or any other desired purpose. During the data gathering operation starting with the block 220, feedback again from the pulse generator 120 (FIG. 4) causes the program steps to strobe the counter 150 for the count corresponding to the instant of transmission of a pulse; and the contents of the time-of-day clock are stored. The program steps contained in the block 220 must operate the latch 154 to control the transmit sequence of frequencies and the latch 152 to strobe the counter 150. The program steps of block 220, at intervals corresponding to the transmission of each first $f_1$ pulse in a sequence, must operate the AND-gate 149 to reset the counter 150 and transfer its contents to the counter 162. After the steps included in the block 220 have been accomplished, the program advances to a decision 222. The decision 222 must be considered in conjunction with the block 220 since the decision 222 determines whether a return or echo interrupt was received by an AND-gate 138. If no echo is received, the logic waits in a short loop for another feedback pulse from the pulse generator 120 to indicate that another sounding pulse has been transmitted from the transducer 22.

As soon as a return or echo interrupt is noted, the decision 222 branches to a block 224 which causes the latch 160 or 152 to strobe its associated counter. Whether the latch 152 is strobed or the latch 160 is strobed is determined by whether or not a successive $f_1$ pulse has been transmitted to start a new sequence. If a new sequence has not been started since the transmission of the pulse resulting in the present echo, the latch 152 is strobed. However, if a new pulse sequence has been started, the latch 160 is strobed; because, the counter 150 is now working on the new sequence of transmission. The block 224 also drives the latch 156 to operate the time windows for receiving echoes as illustrated in the wave forms of FIG. 5.

Once the contents of the appropriate counter have been latched into its associated latch 152 or 160, the block 224 causes a subtraction operation to take place in which the count corresponding to reception of an echo is reduced by the count corresponding to the transmission of that same pulse. This difference signal represents the transit time of the pulse. Once this transit time is determined, the program advances to block 226 which is a recorder output block which corresponds with the program contained in the flow chart of FIG. 3 which entails the transfer of the transit time count and the contents of the time-of-day clock to the data record or minicomputer 100 for further processing; however, without proceeding back to the beginning of the FIG. 3 logic diagram to repeat the cycle.

After the transfer has been completed, the transit time clock count is examined in two decisions 228 and 230. At the decision 228, the transit time count is examined to determine if the upper limit of the depth range has been reached. If it has, the depth range should be increased to the next range step in order to avoid erroneous depth measurements. Therefore, if the upper limit has been reached, the program branches at "D" to go to the auto-depth determination and increase the depth by one range and, of course, set the power level accordingly.

If the count is not representative of the upper limit of the depth range, the program continues to the decision 230 which determines if the count represents the lower limit of the depth range. If "yes", the program also branches to "D" and the range is diminished. If "no", the lower limit of the depth range has not been reached; and the program proceeds to a decision 232 which represents an analysis of the transit time count to determine if it approaches an integral number of one-second intervals.

The purpose of this integral-number-of-one-second-intervals decision 232 is to avoid transmitting a pulse at or very close to the same instant at which an echo pulse is expected to be received. The term "approaching" is set at some arbitrary tolerance around counts representing integral numbers of one-second intervals. If the count does represent an approach to a multiple of one-second intervals, the program advances to a block 234 which causes the microprocessor to energize the AND-gate 122 to operate the delay 119 which delays the output of the pulse generator 120 by sufficient time to prevent the simultaneous or near simultaneous transmission of a pulse and the reception of an echo. This does not adversely affect the timing of the pulses since the counter contents is recorded at each transmission of a pulse as well as at each reception of an echo.

If the decision 232 has determined that the count representing the transit time is not approaching an integral number of one-second intervals, or if the block 234 completes a delay, the program continues on to a decision 236. The decision 236 determines if there is a change in a manual input to the system. If there is no new command, the program returns at "B" to the block 220. Conversely, if there is a new command that has been manually selected during the operation of the last sequence, the program branches at "C" and returns to the input to the decision 176 to find that new command and respond to it.

Although the present invention has been disclosed and is claimed in conjunction with selected exemplary embodiments, it will be understood that these are only examples of the invention and in no sense will be restrictive thereof. It is intended, therefore, that such revisions and variations of the invention which can readily be expected on the part of those skilled in the art, to meet individual design requirements, will be included within the scope of the following claims as equivalents of the present invention.

What is claimed is:

1. A fine-resolution water-depth measuring system comprising:
    means for transmitting from a vessel through water pulses of energy at a first frequency at intervals having a first period;
    means for measuring the time required for transit of each first-frequency pulse to the bottom and the return to the vessel of its echo, wherein the first period is greater than the combined transit time of each transmitted pulse to the bottom and the return of its echo;
    means for transmitting at least one pulse of energy at a second frequency during the time interval between two successive pulses at the first frequency;
    means for receiving from the bottom echoes of each energy pulse;
    means for sorting by frequency said received echoes; and
    means for measuring at least a portion of the time required from transmission of each energy pulse at the second frequency to receipt of its echo.

2. A water-depth measuring system of the type set forth in claim 1 wherein the means for transmitting at least one pulse of energy at a second frequency transmits a plurality of successive pulses at the second frequency prior to transmission of a succeeding pulse of energy at the first frequency.

3. An improved water-depth measuring system comprising:
    means for transmitting through the water successive pulses of energy at a first frequency;
    means for receiving echoes of each pulse from the water bottom, the pulses being separated by a time interval greater than the time of transit of a pulse from the transmitting means to the bottom and the return of its echo back to the receiving means;
    means for transmitting toward the bottom at least a first pulse at a second frequency during the time interval between a first pulse at the first frequency and a second pulse at the first frequency, such that the echo of the first pulse at the first frequency is received after the transmission of the first pulse at the second frequency;
    means for receiving an echo of said pulse at the second frequency; and
    means for measuring at least a portion of the time interval from the transmission of the first pulse at the second frequency to receipt of its echo.

4. An improved water-depth measuring system as set forth in claim 3, the receiving means including means for sorting the received echoes according to frequency.

5. An improved water-depth measuring system according to claim 3 wherein the echo of the first pulse at the second frequency is received after transmission of the second pulse at the first frequency.

6. An improved water-depth measuring system according to claim 3 wherein successive pulses are transmitted at the second frequency prior to the transmission of the second pulse at the first frequency.

7. Apparatus for measuring the depth of a body of water having a bottom comprising:
   transmitter-receiver means for transmitting pulses of energy toward the bottom and receiving echoes of said pulses;
   means for controlling the transmitter-receiver means to transmit said pulses at selected frequencies including at least a first frequency and a second frequency, with at least some successive pulses at the first frequency being separated in time by at least one pulse at the second frequency;
   means for sorting by frequency the echoes received by the transmitter-receiver means; and
   means for measuring the time interval between the transmission of a pulse at the first frequency and the receipt of its echo, and for measuring at least a portion of the time interval between transmission of a pulse at the second frequency and receipt of its echo.

8. Apparatus according to claim 7 wherein the measuring means includes a source of clock pulses and at least one counter, which is reset upon transmission of said first-frequency pulse, for counting clock pulses during the period of time from transmission of said first-frequency pulse at least until return of an echo of that first frequency pulse.

9. Apparatus according to claim 7 wherein the measuring means includes a source of clock pulses and a counter for counting at least a portion of the clock pulses occurring prior to receipt of an echo at the second frequency.

10. A method of measuring the depth of water to a bottom comprising:
    transmitting a first pulse of energy at a first frequency;
    transmitting a pulse of energy at a second frequency before the return from the bottom of an echo of said first pulse;
    transmitting, after a time period sufficient for return from the bottom of an echo of said first pulse, a second pulse at the first frequency;
    receiving echoes from the bottom of all said pulses;
    sorting the echoes according to frequency;
    measuring the transit time for said first pulse from transmission to the bottom and return of its echo; and
    measuring at least a portion of the transit time for said pulse at the second frequency from transmission to the bottom and return of its echo.

11. A method according to claim 10 wherein the measuring of the transit time of said the first pulse and its echo includes generating accurately-timed clock pulses and counting from transmission of said first pulse the number of clock pulses occurring prior to the receipt of the echo of said first pulse.

12. A method according to claim 11 further including counting at least a portion of the clock pulses occurring prior to the return of an echo of the pulse at the second frequency.

13. A method according to claim 10 wherein the measuring of at least a portion of the transit time of the pulse at the second frequency and its echo includes generating accurately-timed clock pulses, and counting at least a portion of the clock pulses occurring prior to the return of the echo of said second-frequency pulse.

* * * * *